Dec. 31, 1963   D. BIERMANN   3,115,937
FEATHERING PROPELLER
Filed Oct. 15, 1962   3 Sheets-Sheet 2

INVENTOR.
DAVID BIERMANN
BY Toulmin & Toulmin
ATTORNEYS

Dec. 31, 1963 D. BIERMANN 3,115,937
FEATHERING PROPELLER
Filed Oct. 15, 1962 3 Sheets-Sheet 3
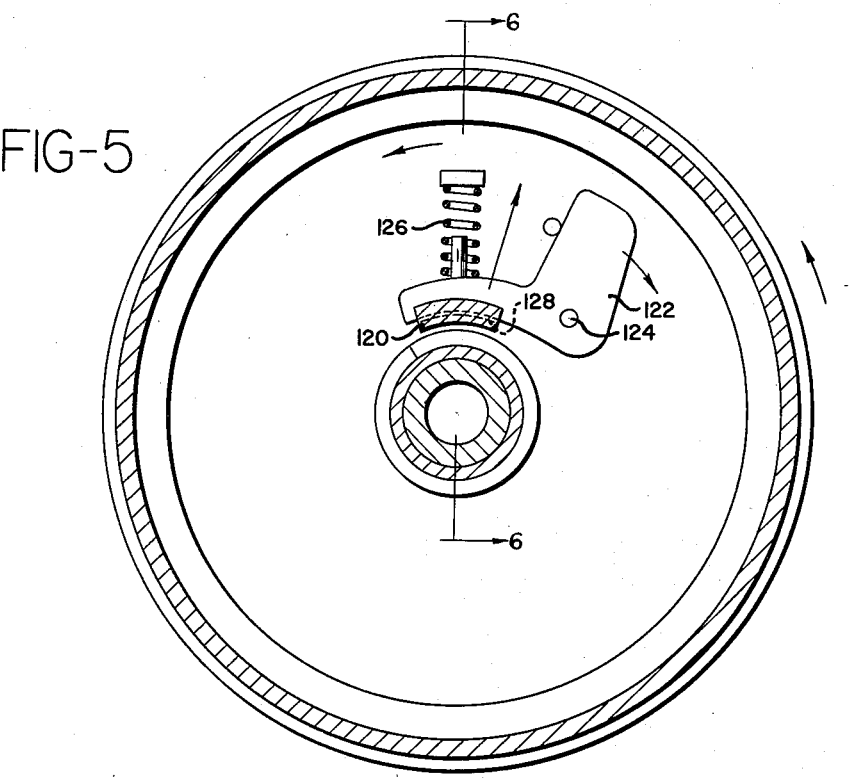
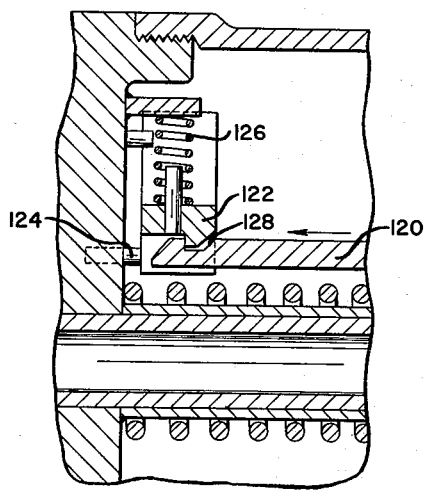
INVENTOR.
DAVID BIERMANN
BY Toulmin & Toulmin
ATTORNEYS United States Patent Office 3,115,937
Patented Dec. 31, 1963

3,115,937
FEATHERING PROPELLER
David Biermann, Piqua, Ohio, assignor to Hartzell Propeller, Inc., Piqua, Ohio, a corporation of Ohio
Filed Oct. 15, 1962, Ser. No. 230,416
16 Claims. (Cl. 170—160.16)

This invention relates to airplane propellers and is particularly concerned with a variable pitch airplane propeller.

Airplane propellers of variable pitch are, of course, well known and are usually hydraulically operated in at least one direction of pitch change. In general, the propellers can be considered to fall into one of two types: the first type where oil pressure is operable for reducing pitch while counter weights on the propeller blades are operable for increasing pitch, usually in combination with springs, and a second type wherein oil pressure increases propeller pitch while the blade centrifugal force decreases pitch, usually in association with a spring.

For non-feathering purposes, the second type has some advantages because counter weights are not required. This is particularly important for light aircraft where propellers of this nature are usually employed, and which class of aircraft comprises a large market. For feathering purposes, however, the system where oil pressure reduces pitch has been used more or less exclusively, since it requires only the addition of a spring to move the propeller to feathered position and a latch arrangement operable for pre-determining a certain high pitch position when the propeller is brought to a halt in the normal manner by stopping the engine. A particular advantage of this arrangement is that the propeller will go to full feathered position in case of a failure of the supply of oil pressure to the propeller while the plane is in flight.

Heretofore attempts to feather propellers utilizing oil pressure have resulted in so many complications with particular respect to auxiliary equipment to supply oil pressure and controls that there have been no commercially successful propellers of this type. Such systems ordinarily involve the use of an auxiliary oil pump, usually electrically driven, and electrical or hydraulic controls.

With the foregoing in mind, it is a primary object of the present invention to provide a propeller arrangement in which feathering of the propeller is accomplished by oil pressure, and in connection with which propeller the aforementioned complications in the form of controls and auxiliary equipment are eliminated.

Another particular object of this invention is the provision of a propeller having a feathering system in which the weight of the propeller is kept to a miniumm.

Another object of this invention is a propeller of the nature referred to which can be produced at a minimum of cost.

It is also an object of the present invention to provide a feathering propeller which requires auxiliary equipment merely in the form of an accumulator and a control valve therefor to insure power for feathering the propeller at all times.

Another object of this invention is the provision of a propeller which will feather by oil pressure and which will latch in feathered position, and wherein the propeller is released from feathered position immediately after starting of the engine so that the propeller can move toward reduced pitch.

FIGURE 5 is a transverse sectional view taken through the propeller hub in the region of the feathering latch showing an inertia sensitive latch arrangement.

FIGURE 6 is a sectional view indicated by line 6—6 on FIGURE 5 showing the inertia latch in cross section.

Figure 1:
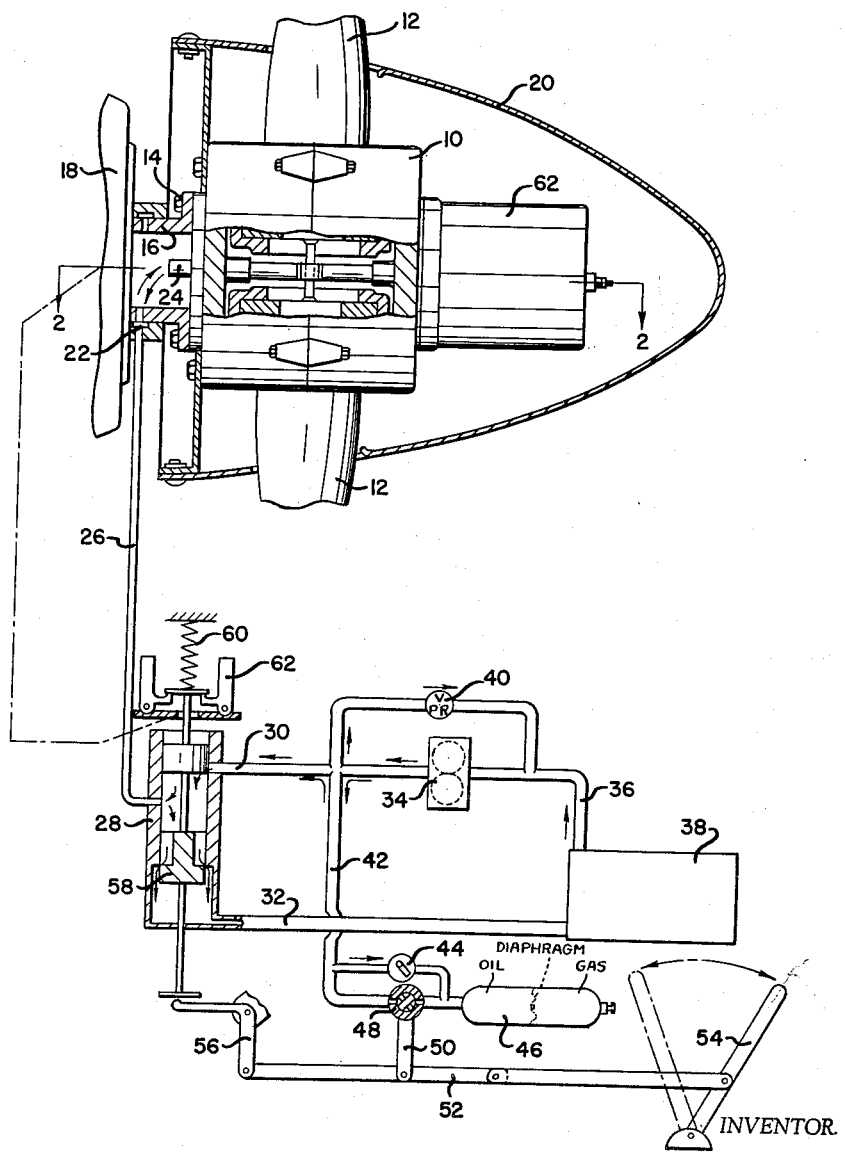
FIGURE 1 is a fragmentary side view of the propeller according to the present invention partly in section and showing a control system according to the present invention connected to the propeller.
Figure 2:
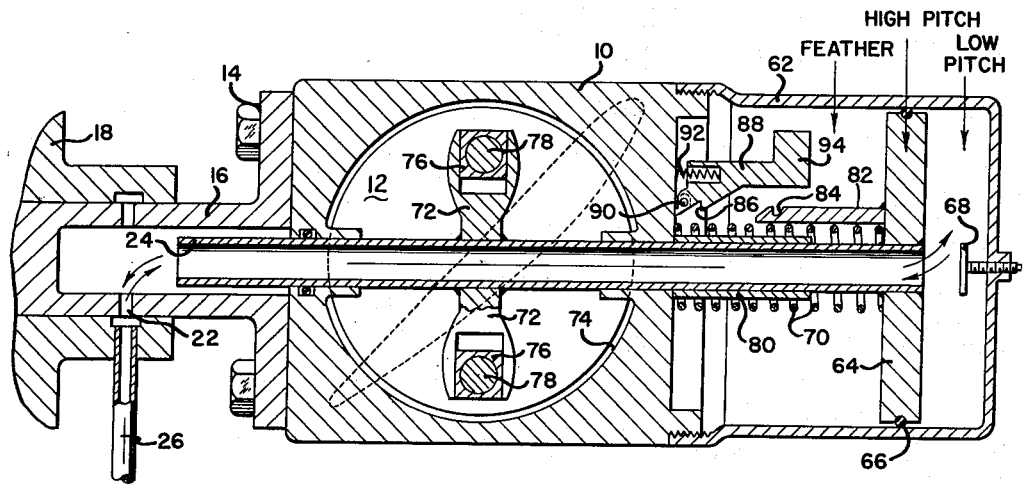
FIGURE 2 is a fragmentary sectional view indicated by line 2—2 on FIGURE 1 showing the construction of the actuating device for changing the pitch of the propeller blades somewhat more in detail.

Referring to the drawings somewhat more in detail, and with particular reference to FIGURES 1 and 2, the propeller according to the present invention comprises a hub portion 10 of any conventional construction that receives the inner ends of blades 12, which are rotatable on their longitudinal axes to vary the pitch of the propeller. Specifically, the blades are rotatable between predetermined low pitch position and a maximum pitch or feathered pitch position.

The propeller hub 10 is bolted at 14 to the drive shaft 16 of an engine 18 so that the propeller is driven in rotation about its axis. A suitable fairing member 20 could be mounted in enclosing relation with the hub if so desired.

A rotary connector 20 mounted in surrounding relation to shaft 16 supplies oil under pressure through shaft 16 to tubular element 24 extending into and through the propeller hub. A conduit 26 is connected to rotary member 22 for supplying oil thereto and is, in turn, connected to the service port of a governor controlled valve 28 that also has an inlet port connected to pressure conduit 30 and an exhaust port connected in drain line 32.

Pressure conduit 30 leads from the discharge side of a fluid pump 34 which may be, for example, a gear pump driven by engine 18. The suction side of pump 34 is connected by conduit 36 to reservoir 38 and to which reservoir drain line 32 also leads.

Relief valve 40 by-passes pump 34 to compensate for excessive pressure that might be developed in conduit 30. A branch 42 conduit 30 leads through a check valve 44 to the inlet side of a pressure accumulator 46 which may be of any suitable conventional type such as a spring loaded accumulator or a gas type accumulator. The check valve 44, of course, opens toward accumulator 46, and according to the present invention, this check valve is by-passed by a control valve 48 that remains closed during normal operation of the propeller, and is only opened when the propeller is to be feathered.

For operating valve 48 there is connected to the movable part thereof a lever 50 which is connected by a link 52 to pilot-operated control lever 54. Link 52 is also connected to a crank lever 56 which is associated with valve member 58 of the previously mentioned governor controlled valve 28.

Valve member 58 controls communication between conduit 26 and conduits 30 and 32. The valve member 58 is normally biased by a spring 60 toward position to connect conduit 26 with drain line 32.

Also associated with valve member 58 is a speed responsive governor 62 which is driven by engine 18 and which, in response to increases in speed of the engine, will move valve member 58 in a direction to connect conduit 26 with pressure conduit 30. The combination of the governor and spring forms a device tending to maintain the engine 18 at constant speed, because an increase in speed of the engine will tend to increase the pitch of the propeller, while a decrease in speed will tend to decrease the pitch of the propeller.

The crank lever 56, when moved in a clockwise direction by pilot adjustment control lever 54, will move valve member 58 upwardly to connect conduit 26 to conduit 30, regardless of the speed of the engine, and at this time valve 48 is opened so that a supply of pressure fluid is delivered to the propeller which will cause it to move to feathered position.

Turning now to FIGURE 2, it will be seen that tube 24 passes completely through hub 10 and into a cylinder 62 mounted on the outer end of the hub. Within cylinder 62 is a piston 64 fixed to the end of tube 24 and sealed to the cylinder wall as by sealing ring 66.

In the outer wall of cylinder 62 is an adjustable abutment element 68 forming a low pitch stop. Between hub 10 and the back of piston 64 is a spring 70 continuously biasing piston 64 toward reduced pitch position.

The movement of the piston 64 and tube 24 is converted into rotation of the propeller blades on their axes by a fork 72 fixed to tube 24 within a central cavity 74 in the propeller hub. The fork 72 engages the blocks 76 into which extend the pins 78, one of which is connected to each of the propeller blades in an eccentric position relative to the axis of rotation of the propeller blade.

Returning to piston 64, mounted in surrounding relation to tube 24 and between hub 10 and piston 64 is a sleeve 80 forming a high pitch stop and which stop is engaged by the piston when the propeller is in feathered position.

There is also connected to the back of piston 64 a latch element 82 having a notch 84 adapted for latching engagement with a pawl-finger 86 carried on an arm 88 pivoted at 90 to the propeller hub. A spring 92 constantly urges arm 88 toward the axis of the propeller, but the arm is so arranged with a mass 94 located outwardly from pivot 90 that rotation of the propeller on its axis will cause the arm to throw outwardly and therefore disengage finger 86 from notch 84 and release the propeller from its feathered position.

When the propeller is rotating at a low speed and the blade centrifugal force, which is proportional to the square of the speed of the propeller, is too low to be effective, the spring 70 is utilized for urging the propeller toward reduced pitch position. When the propeller is rotating at anywhere near its normal speed, the blade centrifugal force will usually be substantially greater than the bias of spring 70.

Figure 3:
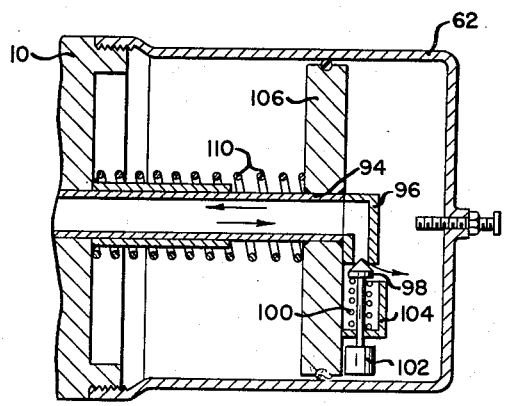
FIGURE 3 is a sectional view corresponding to the right end of FIGURE 2 and showing a modifiied latching arrangement for holding the propeller in feathering position.

In the embodiment illustrated in FIGURE 3, the tube 94 which corresponds to tube 24 of the modification described above, has an angular end portion 96 terminating in a radially directed port that is under the control of a valve member 98 which is urged toward the port by spring 100 and being adapted for being pulled away from the port by a centrifugal weight 102. A bracket 104 fixed to the piston guides the valve member and encloses the spring.

In the FIGURE 3 embodiment, the valve 98 will close on the port in member 96 when the propeller speed is reduced to a predetermined amount, as in the case when the blades become feathered, and this will entrap fluid in the space on the right side of piston 106 and hold the piston in feathered position. When the propeller is again rotating by virtue of the engine being started, and when the speed reaches a predetermined amount, valve 98 will be pushed away from the port which it engages, and the propeller will be again returned to the counter influences of the spring 110 and the blade centrifugal force on the one hand, and on the other hand, the variable supply of oil pressure to the right side of the piston.

Figure 4:
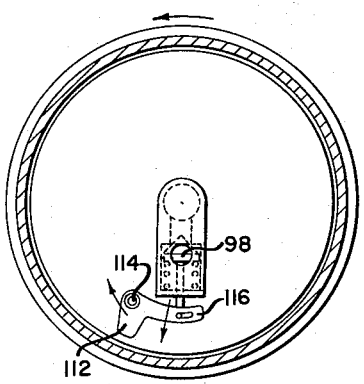
FIGURE 4 is a fragmentary view showing a modified form which the actuator for the latching valve in FIGURE 3 can take.

FIGURE 4 shows an arrangement similar to that of FIGURE 3 except that in FIGURE 4 valve member 98 is connected to an inertia sensitive element 112. Element 112 is pivoted at 114 to the piston and is so arranged that it will be sensitive to positive acceleration of the propeller in its designated direction of rotation so that valve 98 will be opened as soon as the propeller commences to rotate, and will not remain latched in feathered position until any certain speed is attained. The arrangement of the latch, on the other hand, includes a mass at 116 disposed laterally of pivot 114 so that when the propeller does come up to speed, the centrifugal force acting on mass 116 will hold valve member 98 in its open position.

FIGURES 5 and 6 show another arrangement of a combination centrifugal and inertia latch. In these figures there is attached to the back of the piston of the pitch-adjusting motor a bar-like extension 120 corresponding to the element 82 in FIGURE 2. This extension is adapted for cooperation with a latch element 122 pivoted at 124 to the propeller hub. A light spring 126 biases the latch toward a position of engagement with notch 128 and member 120. As will be seen in FIGURE 5, the disposition of the mass of the latch is such that it will be sensitive to acceleration of the propeller in its designated direction of rotation for releasing the latch and will also be sensitive to centrifugal force to hold the latch in released position after the propeller comes up to speed.

Figure 7:
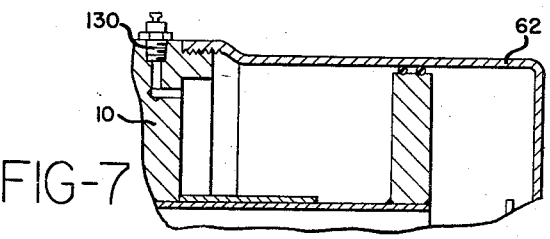
FIGURE 7 is a fragmentary view showing one manner in which the resilient bias for urging the propeller blades toward reduced feather position could be obtained by entrapping gas under pressure behind the piston.

It has been mentioned before that the spring biasing the piston of the pitch-adjusting motor toward reduced pitch could take the form of a body of gas entrapped behind the piston and an arrangement for introducing gas into the space behind the piston is illustrated in FIGURE 7. In this view it will be seen that the pitch reducing spring could be eliminated and there could be provided instead a valve 130 through which gas could be introduced into the space behind the piston and entrapped therein. It will be understood that the resilient biasing of the piston toward reduced pitch position could be accomplished in either of the aforementioned manners.

In operation, the pitch of the propeller is ordinarily adjusted so as to maintain the engine speed constant. If the engine fails but continues to turn, due to the windmilling action of the propeller, the pilot moves control lever 54 to feather position and this will connect conduit 26 with conduit 30 while accumulator valve 48 is opened. Oil is now supplied to the pitch-adjusting motor of the propeller and the piston therein is moved to feathered position. The propeller will then stop rotating, and the latch associated with the propeller piston will latch in feathered position.

If the pilot now wishes to unfeather the propeller, he will first start the engine, which will drive pump 34 and will build up oil pressure in the hydraulic system. This pressure will exert force on the pitch-adjusting piston and release the load on the latch pertaining thereto so that the latch will become disengaged either because of the inertia force acting thereon or by centrifugal force. The pilot will then move lever 54 to normal position, which will return the propeller to the control of the governor valve. At the first instant, movement of lever 54 to its normal position will connect the oil side of the pitch-adjusting piston to drain so that it will commence to move away from feathered position under the influence of the bias thereon. As soon as the blade has moved a few degrees away from feathered position, the wind will pick up the propeller and the r.p.m. will increase. This, in turn, will increase the blade centrifugal force, which will tend to force oil out of the cylinder and the change of pitch of the propeller will soon come into balance with the oil pressure that is now under the control of the governor valve.

As soon as pump 34 is again operating, the lever 54 is returned to its normal position, accumulator 46 commences to charge up so that it will again be provided with a change of fluid under pressure for the next feathering operation.

From the foregoing it will be appreciated that the propeller, according to the present invention, is relatively simple in construction and is certain in its action with respect to feathering, and that a minimum of auxiliary equipment is required in order for the feathering operation to be insured.

It will be understood that this invention is susceptible to modification in order to adapt it to different usages and conditions; and accordingly, it is desired to comprehend such modifications within this invention as may fall within the scope of the appended claims.

I claim:

1. A feathering variable pitch propeller, comprising; a hub, blade means extending radially from the hub, said blade means being rotatably supported on said hub for rotation about the axis of the blade means, a fluid motor element connected to said blade means and movable by a supply of fluid thereto for increasing the pitch of said blade means to the feathered position, a spring means acting on said blade means to move the same to low pitch position, and latch means for locking said blade means at said feathered position, said latch means becoming ineffective upon rotation of said propeller and becoming effective when said rotation has substantially ceased.

2. A feathering hydraulically actuated propeller comprising; a hub, blades extending radially from said hub, said blades being rotatably supported on said hub for rotation about the axes of said blades, a fluid motor carried by the hub and having an element connected to said blades and movable by a supply of fluid to the motor for increasing the pitch of the blades, a governor means regulating the supply of said fluid to said motor in response to changes in rotational speed of the propeller, manual means for overriding said governor means, thereby supplying fluid to said fluid motor for feathering the blades irrespective of rotational speed of the propeller, latching means arranged for locking said blades in the feathered position, said latching means becoming effective below a predetermined rotational speed of the propeller and becoming ineffective above a predetermined rotational speed of the propeller, and resilient means connected to said blades operable for moving them towards low pitch position in the absence of fluid pressure acting on said fluid motor when said manual override means is not in effect.

3. A propeller hub adapted for being mounted on an engine shaft for rotation thereby, blades mounted in said hub for rotation on their axes, a fluid motor on said hub having a cylinder element and a piston element, means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce pitch of said blades, and latch means for locking the blades in feathered position, said latch means being sensitive to rotational conditions of said propeller for becoming effective and ineffective.

4. A propeller hub adapted for being mounted on an engine shaft for rotation thereby, blades mounted in said hub for rotation on their axes, a fluid motor on said hub having a cylinder element and a piston element, a means connecting one of said elements with said blades for causing rotational movement of said blades on their axes in response to movement of said one element, stop means limiting the travel of said one element to predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce the pitch of said blades, and latch means for locking the blades in feathered position, said latch means becoming effective below a predetermined rotational speed and becoming ineffective above a predetermined rotational speed.

5. A propeller hub adapted for being mounted on an engine shaft for rotation thereby, blades mounted in said hub for rotation on their axes, a fluid motor on said hub having a cylinder element and a piston element, a means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce the pitch of said blades, and latch means for locking the blades in feathered position, said latch means becoming effective upon stopping the rotation of said hub and becoming ineffective upon starting the rotation of said hub.

6. A propeller hub adapted for being mounted on an engine shaft for rotation thereby, blades mounted in said hub for rotation on their axes, a fluid motor on said hub having a cylinder element and a piston element, means connecting one of said elements with said blades for causing rotational movement of said blades on their axes in response to movement of said one element, stop means limiting the travel of said one element to a predetermined low pitch position of said blades in one direction and feathered pitch position of said blades in the other direction, means for supplying oil under pressure to one side of said one element for moving it in said other direction to increase the pitch of said blades to the full feathered position, resilient means acting on said one element tending to move it in said one direction to reduce pitch of said blades, and latch means for locking the blades in feathered position, said latch means being sensitive to rotational conditions of said propeller and being moveable into effective position in response to a reduction in speed of said propeller to below normal speed, said resilient means comprising spring means.

7. A propeller hub adapted for being mounted on an engine shaft for rotation thereby, blades mounted in said hub for rotation on their axes, a fluid motor on said hub having a cylinder element and a piston element, means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce pitch of said blades, and latch means for locking the blades in feathered position, said latch means being sensitive to rotational conditions of said propeller and being moveable into effective position in response to a reduction in speed of said propeller to below normal speed, said resilient means comprising compressed gas trapped on the side of said one element opposite to one side thereof.

8. A propeller hub adapted for being mounted on an engine shaft for rotation thereby, blades mounted in said hub for rotation on their axes, a fluid motor on said hub having a cylinder element and a piston element, means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce pitch of said blades, and latch means for locking the blades in feathered position, said latch means being sensitive to rotational conditions of said propeller and being moveable into effective position in response to a reduction in speed of said propeller to below normal speed, said blades having their masses distributed such that centrifugal force acting on the masses tends to move said blades into low pitch when the propeller is rotating.

9. A propeller hub mounted for rotation on an engine shaft, blades rotatably mounted on said hub, a cylinder mounted on said hub, a piston slidably mounted within said cylinder, link means connecting said piston with said blades providing rotational movement of said blades on their axes in response to linear movement of said piston in said cylinder, conduit means for supplying oil under pressure to one side of said piston to move it in one direction to increase the pitch of said blades to the feathered position thereof, resilient means acting on the piston tending to move it in the other direction to reduce the pitch of the blades, stops attached to both ends of said cylinder engageable by said piston operable for limiting the movement of said piston in said one direction to the feathered position of the blades and in the other direction to a predetermined low pitch position of said blades, and check valve means in said conduit means for preventing oil from being exhausted from said one side of said piston, said check valve being sensitive to rotational conditions of said propeller and being ineffective during rotation of the propeller at normal speed and becoming effective upon reduction of the propeller speed.

10. A propeller hub mounted for rotation on an engine shaft, blades rotatably mounted on said hub, a cylinder mounted on said hub, a piston slidably mounted within said cylinder, link means connecting said piston with said blades providing rotational movement of said blades on their axes in response to linear movement of said piston in said cylinder, conduit means for supplying oil under pressure to one side of said piston to move it in one direction to increase the pitch of said blades to the feathered position thereof, resilient means acting on the piston tending to move it in the other direction to reduce the pitch of the blades, stops attached to both ends of said cylinder engageable by said piston operable for limiting the movement of said piston in said one direction to the feathered position of the blades and in the other direction to a predetermined low pitch of said blades, and check valve means in said conduit means biased toward effective position and operable when in effective position for preventing oil from being exhausted from said one side of said piston, said check valve automatically becoming ineffective whenever the propeller is rotating above a predetermined speed.

11. A propeller hub adapted for being mounted on an engine shaft for rotation thereby, blades mounted in said hub for rotation on their axes, a fluid motor on said hub having a cylinder element and a piston element, means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said element for moving it in said other direction to increase the pitch of said blades to the full feathered position, resilient means acting on said one element tending to move it in said one direction to reduce pitch of said blades, and latch means for locking the blades in feathered position, said latch means being sensitive to rotational conditions of said propeller and being moveable into effective position in response to a reduction in speed of said propeller to below normal speed, said means for supplying oil under pressure to one side of said element including a reservoir of oil under pressure.

12. A propeller hub adapted for being mounted on an engine shaft for rotation thereby, blades mounted on said hub for rotation on their axes, a fluid motor on said hub having a cylinder element and a piston element, a means connecting one of said elements with said blades for causing rotational movement of said blades on their axes in response to movement of said one element, stop means limiting the travel of said one element to a predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce pitch of said blades, and latch means for locking the blades in feathered position, a spring urging said latch means toward effective position, and a centrifugal weight connected to said latch means sensitive to rotational speed of the propeller for moving the latch means to ineffective position.

13. A propeller hub adapted for being mounted on an engine shaft for rotation thereby, blades mounted in said hub for rotation on their axes, a fluid motor on said hub having a cylinder element and a piston element, a means connecting one of said elements with said blades for causing rotational movement of said blades on their axes in response to movement of said one element, stop means limiting the travel of said one element to predetermined low pitch position in one direction and feathered pitch position in the other direction, means for supplying oil under pressure to one side of said one element for moving it in said other direction to increase the pitch of said blades to the full feathered position, resilient means acting on one said element tending to move it in said one direction to reduce the pitch of said blades, and latch means for locking the blades in feathered position, a spring urging said latch means toward effective position, and a weight pivotally mounted adjacent said latch means and connected thereto sensitive to change of speed of the propeller for moving said latch means to ineffective position.

14. A propeller hub adapted for being mounted on an engine shaft for rotation thereby, blades mounted in said hub for rotation on their axes, a fluid motor on said hub having a cylinder element and a piston element, a means connecting one of said elements with said blades for causing rotational movement of said blades on their axes in response to movement of said one element, stop means limiting the travel of said one element to predetermined low pitch position in one direction and feathered pitch position in the other direction, means for supplying oil under pressure to one side of said one element for moving it in said other direction to increase the pitch of said blades to the full feathered position, resilient means acting on said one element tending to move it in said one direction to reduce the pitch of said blades, and latch means for locking the blades in feathered position, a spring urging said latch means toward effective position, and a weight pivotally mounted adjacent said latch means and connected thereto sensitive to a change of speed of the propeller for moving said latch means to ineffective position, said weight also being sensitive to rotational speed of said propeller for moving said latch means to ineffective position.

15. A feathering variable pitch propeller comprising;

a hub, blades extending radially from the hub, said blades being rotatably supported on said hub for rotation about the axis of each blade and being acted upon by centrifugal force tending to reduce the pitch thereof during rotation of the propeller, a fluid motor carried by the hub and having a moveable element connected to said blades, a fluid supply system connected to said motor to actuate said element for increasing the pitch of said blades to the feathered position, resilient means also acting on said fluid motor element tending to decrease the pitch of said blades, speed responsive governor means connected to the propeller and regulating the flow of said fluid from said supply system to and from said motor in response to changes in rotational speed of the propeller, manual means for overriding said governor means whereby said supply of fluid can be connected to said fluid motor for feathering the blades irrespective of the rotational speed of the propeller and latching means arranged for locking the blades in the feathered pitch position, said latching means becoming effective below a predetermined rotational speed of the propeller and becoming ineffective above a predetermined rotational speed of the propeller.

16. A feathering variable pitch propeller, comprising; a hub, blades extending radially from the hub, said blades being rotatably supported on said hub for rotation about the axis of each blade and being acted upon by centrifugal force tending to reduce the pitch thereof during rotation of the propeller, a fluid motor carried by the hub and having a moveable element connected to said blades, a fluid supply system connected to said motor to actuate said element for increasing the pitch of said blades to the feathered position, a resilient means also acting on said fluid motor element tending to decrease the pitch of said blades, a speed responsive governor means connected to the propeller and regulating the flow of said fluid from said supply system to and from said motor in response to changes in rotational speed of the propeller, manual means for overriding said governor means whereby said supply of fluid can be connected to said fluid motor to actuate said element for feathering the blades irrespective of the rotational speed of the propeller, an accumulator comprising a closed vessel having two compartments, one compartment containing fluid and the other compartment containing a gas under pressure, a diaphragm in the accumulator separating said two compartments, a first fluid pipe connecting the fluid compartment of said accumulator with said fluid supply system, a manually operable valve closing said first fluid pipe when the governor is operable and opening said pipe when the governor is being overridden by said manual means, a second fluid pipe connecting the fluid compartment of said accumulator with said fluid supply system, a check valve closing said second fluid pipe when the pressure in the accumulator is greater than the pressure in the fluid supply system, and latching means arranged for locking the blades in featured pitch position, said latching means becoming effective below a predetermined rotational speed of the propeller and becoming ineffective above a predetermined rotational speed of the propeller.

References Cited in the file of this patent

UNITED STATES PATENTS

| | | |
|---|---|---|
| 1,913,733 | Squires | June 13, 1933 |
| 2,049,954 | Gilbert | Aug. 4, 1936 |
| 2,105,843 | Preston | Jan. 18, 1938 |
| 2,391,778 | Gregor | Dec. 25, 1945 |
| 2,472,181 | Werth | June 7, 1949 |
| 2,556,719 | Cushman | June 12, 1951 |
| 2,625,998 | Berninger | Jan. 20, 1953 |
| 2,781,856 | Danvers | Feb. 19, 1957 |
| 2,948,344 | Biermann | Aug. 9, 1960 |